United States Patent [19]

Kawai et al.

[11] 3,878,087

[45] Apr. 15, 1975

[54] METHOD FOR PRODUCING RESINOUS PITCH

[75] Inventors: Yoshio Kawai; Tadashi Araki, both of Tokyo; Kazuhiro Watanabe, Kawaguchi; Ryoichi Takahashi; Kazuo Noguchi, both of Tokyo; Nobuo Hatazawa, Sendai; Nobuo Hatazawa, Tokyo, all of Japan

[73] Assignee: Kureha Kagaku Kogyo Kabushiki Kaisha, Tokyo, Japan

[22] Filed: May 16, 1973

[21] Appl. No.: 360,906

Related U.S. Application Data

[63] Continuation-in-part of Ser. No. 165,333, July 22, 1971, abandoned, which is a continuation-in-part of Ser. No. 813,330, April 3, 1969, abandoned.

[30] Foreign Application Priority Data

Apr. 4, 1968 Japan.............................. 43-21948
Apr. 20, 1948 Japan.............................. 43-26350
Apr. 20, 1968 Japan.............................. 43-26351

[52] U.S. Cl. .................. 208/40; 106/273; 208/22; 208/42; 208/67; 208/100; 260/679 R
[51] Int. Cl. ........................ C10c 1/04; C10g 9/00
[58] Field of Search .............. 106/273, 284, 679 R; 208/10, 41, 68, 73, 74, 40, 108, 100, 22, 40, 42, 67; 264/29, 105

[56] References Cited

UNITED STATES PATENTS

| 2,305,440 | 12/1942 | Noel .................................. 208/22 |
| 2,903,409 | 9/1959 | Horse ................................. 208/22 |
| 2,944,958 | 7/1960 | Goldthwait et al. ................ 208/22 |
| 3,318,801 | 5/1967 | Alexander et al. ................. 208/40 |
| 3,350,295 | 10/1967 | Hamner et al. ..................... 208/4 |
| 3,617,477 | 11/1971 | Gomi .................................. 208/40 |

Primary Examiner—Herbert Levine
Attorney, Agent, or Firm—Fitzpatrick, Cella, Harper & Scinto

[57] ABSTRACT

A process for producing a resinous pitch composition in powder form, wherein a crude oil or liquid fraction thereof is subjected to thermal cracking for acetylene production to obtain a tarry substance therefrom, the substance is then distilled at a specified temperature and under pressure to result in a pitch product having enhanced properties; and the product is finally ground into powder form.

2 Claims, No Drawings

METHOD FOR PRODUCING RESINOUS PITCH

REFERENCE TO THE RELATED APPLICATIONS

This is a continuation-in-part application of our co-pending application Ser. No. 165,333, filed July 22, 1971, for "Resinous Pitch Compositions and Formed Articles Thereof," now abandoned, which in turn is a continuation-in-part application Ser. No. 813,330, filed Apr. 3, 1969 for the same title of invention and now abandoned.

BACKGROUND OF THE INVENTION

*a. Field of Invention*

This invention relates generally to petroleum hydrocarbon products and to resinous pitch. More particularly, the invention is concerned with new resinous pitch containing as constituent components thereof aromatic rings or aromatic rings and aliphatic rings, to the production of these pitch, and to the production of materials in powder form by subjecting these pitch compositions to various treatments.

*b. Discussion of Prior Art*

As a pitch-like substance generally used as a protecting material, such as a heat-shield material, thermal insulation material, and sealing material, an asphalite known as gilsonite has heretofore been well known, one seller of this material being the American Gilsonite Company.

While gilsonite is a very useful material, its quality is not necessarily constant in all cases, and the securing of a stable supply quantity is also difficult, since this material is a bituminous material of natural occurrence. Accordingly, there has been a great demand for a synthetic material which has a consistent quality and can be supplied in ample quantity at low price.

In an attempt to solve this problem, there have been made a variety of trials to produce materials of a structure and properties similar to those of gilsonite with asphalt fractions from petroleum refineries. However, there has been no success to date in supplying economically a powder material having characteristics equivalent to those of gilsonite.

Furthermore, bituminous substances have heretofore been applied as architectural or constructional materials for civil engineering generally by heating these substances to or above their softening temperatures, or by cutting back these substances with suitable light oils, and then applying the resulting fluid-state materials. The purpose of such cutting back is to lower the viscosity of the asphalt or pitch-like substance due to the dissolving thereof by the addition of the light oils thereby to improve the applicability of the bituminous material and preservability thereof over a long period. Most of the added light oils are caused to be removed by evaporation after application of the bituminous material.

Also, there has been known various techniques of producing pitches useful for such purposes from residual oils of petroleum cracking such as, for example, U.S. Pat. No. 3,318,801, 3,350,295, and so forth.

The process U.S. Pat. No. 3,318,801 is to subject crude petroleum to thermal cracking at a temperature within a normal range of from 1,400° to 1,600°F (760 to 872°C), from which ethylene, propylene, etc. are produced. The bottom oil remaining after production of such hydrocarbons is used as the raw material, which is subjected to soaking at a temperature range of from 750°F to 900°F (400° to 483°C) to obtain pitches.

On the other hand, U.S. Pat. No. 3,350,295 teaches to cause residual oils from petroleum distillation or residual oils from contact-decomposition or thermal decomposition of gas oil fractions to dealkylation reaction in a fluidized coker at a temperature range of from 1,300° to 1,600°F (704° to 872°C), and subsequently to cause the dealkylated substance to oxidation to obtain pitch for manufacturing electrodes.

The pitches produced by these existing prior art process exhibit the softening temperature of 250°F (121°C) and contain the benzene insoluble component of below 25%. It should be recognized that where the temperature range for the thermal cracking differs, these would yield different sorts of cracked residue, and this difference in the resultant product results in difference in the benzene insoluble component and softening point of the substance. The pitches of the prior art process are of such low benzene insoluble component and softening point that they do not meet the purpose of the present invention.

SUMMARY OF THE INVENTION

In view of the above-described state of the art, it is an object of the present invention to utilize certain findings we have made as described hereinafter in overcoming the above-described difficulties accompanying the prior art, particularly, the use of natural asphalt and asphaltites.

More specifically, it is a primary object of the invention to provide synthetic pitch compositions in powder form of a quality in characteristics and applicability equal or superior to those of natural bituminous substances.

According to the present invention, briefly summarized, there is provided a process for producing resinous pitch which comprises steps of causing crude oil or liquid fractions thereof to undergo thermal cracking for acetylene production at a temperature of from 1,100° to 1,500°C under normal pressure with a heat medium of combustion flame or high temperature steam for a contact time of from 0.1 to 0.001 second to produce a tarry substance, then heating the thus obtained tarry substance under pressure ranging from normal pressure to 10 kg/cm$^2$ (atm.) at a temperature of from 250° to 450°C to distill light oil fractions including volatile matters, whereby there is obtained a final pitch product of an H/C atomic ratio of from 0.4 to 0.65, containing no nitrogen and oxygen, a softening point of from 150° to 400°C, a benzene-insoluble component of from 50 to 90 percent by weight, a specific gravity of from 1.2 to 1.5, and a grindability of from 4 to 200 meshes, a fixed carbon content of from 60 to 85, and mean molecular weight of from 60 to 3,000, and this final pitch product is ground to produce a pitch in powder form.

The nature, details, and utility of the present invention will become more apparent from the following detailed description beginning with general considerations and concluding with specific examples of practice constituting preferred embodiments of the invention.

DETAILED DESCRIPTION OF THE INVENTION

The pitch according to the present invention, differing completely in chemical structure from natural asphalts and containing a large number of side chains and bond chains based on paraffinic type carbon due to X-ray analysis, is composed mainly of aromatic rings, or aromatic rings and aliphatic rings with a few side chains and bond chains based on paraffinic type carbon.

We have found that such a pitch composition having a new structure as described above and, moreover, having characteristics equal or superior to those of known natural asphalts and other bituminous materials can be readily prepared by subjecting a crude oil or liquid fraction thereof, naphtha (gasoline fraction), kerosene, gas oil, or fuel oil to first-stage process comprising thermal cracking for acetylene production at a high temperature above 1,100°C and below 1,500°C under normal pressure with a heat medium of combustion flame or high temperature steam for a contact time of the order of from 0.001 to 0.1 second, subjecting the resulting tarry substance to a second-stage process comprising heat treatment at a temperature of from 250° to 450°C under pressure ranging from normal pressure to 10 kg/cm²(atm.) to distill light oil fractions from the process material, and to prepare the pitch from the residue thus formed.

We have found that, by carrying out ordinary hydrogenation between the first-stage heating process and the second-stage heating process to cause transformation of one portion of the aromatic rings into aliphatic rings and then carrying out the second-stage heating process, a pitch of highly desirable characteristics can also be produced.

The purpose or significant mechanism of the first-stage reaction comprises cracking the petroleum hydrocarbon at a high-temperature to convert one portion thereof into a gaseous substance containing acetylene and ethylene and, at the same time, to cause one portion thereof to undergo polycondensation, thereby converting the same into a polycondensation product of predominantly fused aromatic rings. During this process, substances such as nitrogen and oxygen which tend to become causes of polar structure are almost discharged into gases and removed.

The purpose or significant mechanism of the above-mentioned second-stage reaction comprises removing the oily substances in the tarry substance obtained by the first-stage reaction thereby to produce a pitch. We have found that this distilling operation is preferably carried out under pressure ranging from normal pressure to 10 kg/cm² and at a temperature range of from 250° to 450°C. Below 250°C, there would remain some amount of light oil fractions, the principal component of which is aromatic hydrocarbons having a boiling point below 250°C such as benzene, toluene, xylene, naphthalene, methylnaphthalene, acenaphthene, indene, and so forth, and which adversely affect the properties of the resulting pitch composition, while, at a process temperature above 450°C, there inevitably takes place deterioration of the properties of the pitch due to "coking."

The significant mechanism of the hydrogenation process carried out prior to the second-stage heating process is the transformation of a portion of the aromatic rings into aliphatic rings to lower the softening point of the product and to afford great convenience and facility in applications of the powder pitch for the wide range of uses thereof.

The tarry substance obtained by the process at a high temperature above 1,100°C to be used in the production of this pitch composition is a by-product produced in large quantities in industries such as the petrochemical industry having the object of producing olefins and the gas-producing industry in which crude oils or fuel oils are decomposed at high temperatures and, in most cases, is regarded as a waste material.

The pitch in powder form produced in the above-described manner is particularly suitable for use as an insulating material, for which purpose it is necessary that this material have the following characteristics.

| | | |
|---|---|---|
| a. | Color | : Brown to brownish black |
| b. | True specific gravity | : 1.200 to 1.500 |
| c. | Softening point | : 150 to 400°C |
| d. | Matter insoluble in benzene | : 50 to 90% by weight (as measured in accordance with Japanese Industrial Standard Designation JIS-K 2421) |
| e. | Grindability | : Grindable to 4 to 200 mesh size |
| f. | H/C atomic ratio | : 0.4 to 0.65 |
| g. | Oxygen and nitrogen content | : none |
| h | Mean molecular weight | : 600 to 3,000 |
| i. | Fixed carbon content | : 60 to 85% |

We have found that, when this powdered pitch was used as a protective and insulative material, it exhibited marked superiority over conventionally used natural asphalts in water-repelling property and durability relative to effects of water and was far superior also in thermal insulation.

Furthermore, in application as a coating on metal surfaces, the pitch of the invention was found to be far superior in adhesivity with respect to the metal surfaces.

This material has been found to be highly effective for protection and thermal insulation of various pipings such as those for chilled water, hot water, and steam and for underground pipings.

The terms "powder" and "powdered form" as used in this specification designate powder material of any particle size passing through a sieve of 4-mesh size.

In its use as various protective materials as enumerated above, the pitch according to the present invention can, of course, be used solely but depending on the necessity or intended use, various materials as, for example, bituminous materials such as asphalts, coal tar pitches, and natural asphalts and asphaltites and inorganic substances such as clays, silica, and pearlite may be added to the pitch.

PREFERRED EMBODIMENT OF THE INVENTION

In order to indicate still more fully the nature and utility of the present invention, the following examples of practice constituting preferred embodiment thereof and results as set forth, it being understood that these examples are presented as illustrative only and that they are not intended to limit the scope of the present invention.

EXAMPLE 1

Naphtha was cracked under the conditions of a reaction temperature of 1,200°C and a contact time of 0.03 second, whereupon tarry substances and gaseous substances such as acetylene and ethylene were obtained. This tarry substance was divided into three sample lots, which were dry-distilled to remove more light oil fraction containing volatile matter, and thus ground respectively to a mesh size of from 80 to 200 under the following conditions, whereby a pitch composition in powder form was produced.

Sample 1: Dry Distillation at 450°C
Sample 2: Dry distillation at 350°C
Sample 3: Hydrogenation for 12 hours at 250°C with an initial hydrogen pressure of 100 kg in the presence of a hydrogenation catalyst prepared by causing 15% of nickel to deposit on diatomaceous earth. Then dry distillation at 400°C. Each of the above samples has the following properties.

| Sample No. | H/C | Specific Gravity | Benzene Insoluble Component |
|---|---|---|---|
| 1 | 0.51 | 1.38 | 70 |
| 2 | 0.53 | 1.35 | 65 |
| 3 | 0.60 | 1.28 | 52 |

Each of the samples thus prepared was placed in a pipe of inner diameter of 3 cm to a thickness (depth) of 5 cm, and an electrode was enclosed therewithin at a position 1 cm from the top thereof. Water pressure was then applied to each sample through the pipe, and the water pressure at which water infiltrated through the sample to the electrode to cause a fluctuation in a meter connected to the electrode was measured as an indication of the water-repellent property of the sample.

The results of comparison of the water-repellent properties of these sample compositions with those of two asphalts generally sold on the market as indicated in Table 1 below.

Table 1

| SAMPLE (Particles passing 100-mesh, remaining on 200-mesh sieve) | SOFTENING POINT (°C) | WATER-REPELLENT PROPERTY (kg/cm$^2$) |
|---|---|---|
| 1 | 230 – 250 | 1.0 |
| 2 | 160 – 170 | 0.95 |
| 3 | 150 – 155 | 0.85 |
| Natural asphalt (A) | 60 – 165 | 0.5 |
| Natural asphalt (B) | 135 – 140 | 0.3 |

As is apparent from these results, the water-repellent properties of the pitch compositions according to the present invention are superior to those of the known natural asphalts.

Furthermore, as a result of long-period tests, the natural asphalt (A) exhibited water resistance for only one hour under 0.5 kg/cm$^2$, whereas all of the pitch compositions 1, 2, and 3 did not exhibit any change after 1 week under the same pressure, thereby indicating a remarkable degree of improvement in water resistance and water-repellent property.

EXAMPLE 2

A holder structure of concrete was installed outdoors in the ground, and a 1-inch pipe was fixed thereto. Next, sample 1 of Example 1 was placed around the pipe to a thickness of 10 cm and was compacted by tamping. A 30-cm layer of earth and sand was then laid to cover the sample 1 and compacted. The sample was then left for three months, after which the pipe was disinterred and was found to be unchanged.

In contrast, when the natural asphalt (A) was used in place of sample 1 and installed under the same conditions as set forth above, the pipe was found after three months to have rusted.

In addition, a portion of the coating material according to the present invention after compaction by tamping was taken, and the thermal conductivity and density thereof were measured, whereupon the following excellent results were obtained.

| Thermal conductivity: | 0.055 k Cal/hr/m$^2$/°C/m |
|---|---|
| Density: | 0.68 g/cm$^3$ |

What we claim is:
1. A process for producing a resinous pitch composition which consists essentially of:
   a. subjecting naphtha to thermal cracking for acetylene production at a temperature of from 1,100° to 1,500°C. under normal pressure with a heat medium selected from the group consisting of combustion flame and high temperature steam for a contact time of from 0.001 to 0.1 second to produce a tarry substance:
   b. further subjecting said tarry substance to distillation under pressure ranging from normal pressure to 10kg/cm$^2$(atm.) at a temperature of from 250° to 450°C. to remove light oil fractions including volatile matter therefrom; and
   c. grinding the heat-treated product into powder form having a particle size range of from 4 to 200 meshes,
   said ground product being characterized by a softening point of from 150° to 400°C., a benzene-insoluble component of from 50 to 90% by weight, and a specific gravity of from 1.2 to 1.5.

2. The process according to claim 1, further including the step of subjecting the substance obtained from the thermal cracking step to hydrogenation prior to said distillation step to cause transformation of a portion of the aromatic rings in said cracked naphtha into aliphatic rings.

* * * * *

UNITED STATES PATENT OFFICE
CERTIFICATE OF CORRECTION

Patent No. 3,878,087   Dated April 15, 1975

Inventor(s) YOSHIO KAWAI et al.

It is certified that error appears in the above-identified patent and that said Letters Patent are hereby corrected as shown below:

Front page, at "[75] Inventors:", line 5 thereof, change "Nobuo Hatazawa" to -- Hiromitsu Makita"

Column 1, line 8, after "application" insert -- of --;
         line 61, after "process" insert -- of --.

Column 2, line 10, change "cess" to -- cesses --;
         line 18, change "process" to -- processes.

Column 3, line 67, after "by-product" insert -- presently --.

Column 5, line 33, change "market as" to -- market are --.

Signed and Sealed this ninth Day of September 1975

[SEAL]

Attest:

RUTH C. MASON
Attesting Officer

C. MARSHALL DANN
Commissioner of Patents and Trademarks